United States Patent
Jun et al.

(10) Patent No.: US 11,445,160 B2
(45) Date of Patent: Sep. 13, 2022

(54) IMAGE PROCESSING DEVICE AND METHOD FOR OPERATING IMAGE PROCESSING DEVICE

(71) Applicant: SAMSUNG ELECTRONICS CO., LTD., Suwon-si (KR)

(72) Inventors: Sung Ho Jun, Hwaseong-si (KR); Kil Whan Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/034,403

(22) Filed: Sep. 28, 2020

(65) Prior Publication Data
US 2021/0021796 A1    Jan. 21, 2021

Related U.S. Application Data

(63) Continuation of application No. 16/181,957, filed on Nov. 6, 2018, now Pat. No. 10,819,965.

(30) Foreign Application Priority Data

Jan. 26, 2018    (KR) .................. 10-2018-0010128
Apr. 10, 2018    (KR) .................. 10-2018-0041786

(51) Int. Cl.
*H04N 9/808*    (2006.01)
*G11B 20/00*    (2006.01)
(Continued)

(52) U.S. Cl.
CPC ..... *H04N 9/8082* (2013.01); *G11B 20/00007* (2013.01); *G11B 20/10527* (2013.01);
(Continued)

(58) Field of Classification Search
CPC ...... H04N 9/8082; H04N 9/825; H04N 19/00; H04N 19/186; H04N 19/124;
(Continued)

(56) References Cited

U.S. PATENT DOCUMENTS 6,650,773 B1    11/2003    Maurer et al.
6,674,479 B2    1/2004    Cook et al.
(Continued)

FOREIGN PATENT DOCUMENTS

CN    103501437    1/2014
WO    2007064977    6/2007

OTHER PUBLICATIONS

Written Opinion and Search Report dated May 27, 2019 Corresponding To Related Singapore Patent Application No. 10201810709T.
(Continued)

*Primary Examiner* — Girumsew Wendmagegn
(74) *Attorney, Agent, or Firm* — F. Chau & Associates, LLC

(57) ABSTRACT

An image processing device includes a multimedia intellectual property (IP) block which processes image data including a first component and a second component; a memory; and a frame buffer compressor (FBC) which compresses the image data to generate compressed data and stores the compressed data in the memory. The frame buffer compressor includes a logic circuit which controls a compression sequence of the first component and the second component of the image data.

20 Claims, 13 Drawing Sheets

(51) Int. Cl.
*H04N 9/825* (2006.01)
*G11B 20/10* (2006.01)
*H04N 19/186* (2014.01)
*H04N 19/00* (2014.01)
H04N 19/176 (2014.01)
H04N 19/61 (2014.01)
H04N 19/124 (2014.01)
H04N 19/146 (2014.01)
H04N 19/60 (2014.01)
H04N 19/91 (2014.01)
H04N 19/50 (2014.01)

(52) U.S. Cl.
CPC ............. *H04N 9/825* (2013.01); *H04N 19/00* (2013.01); *H04N 19/186* (2014.11); *G11B 2020/00072* (2013.01); *H04N 19/124* (2014.11); *H04N 19/146* (2014.11); *H04N 19/176* (2014.11); *H04N 19/50* (2014.11); *H04N 19/60* (2014.11); *H04N 19/61* (2014.11); *H04N 19/91* (2014.11)

(58) Field of Classification Search
CPC .... H04N 19/146; H04N 19/176; H04N 19/50; H04N 19/60; H04N 19/61; H04N 19/91; H04N 19/423; H04N 19/48; G11B 20/00007; G11B 20/10527; G11B 2020/00072

See application file for complete search history.

(56) References Cited

U.S. PATENT DOCUMENTS

| | | | |
|---|---|---|---|
| 6,717,987 | B1 | 4/2004 | Scarpino et al. |
| 6,747,661 | B1 | 6/2004 | Peterson |
| 8,761,531 | B2 | 6/2014 | Goma |
| 9,584,816 | B2 | 2/2017 | Demos |
| 2009/0161753 | A1* | 6/2009 | Youn .................... H04N 19/124 375/240.01 |
| 2011/0150072 | A1* | 6/2011 | Han ..................... H04N 19/196 375/240.01 |
| 2011/0206289 | A1 | 8/2011 | Dikbas et al. |
| 2014/0092998 | A1 | 4/2014 | Zhu et al. |
| 2018/0007386 | A1 | 1/2018 | Diefenbaugh et al. |
| 2019/0238817 | A1 | 8/2019 | Jun et al. |

OTHER PUBLICATIONS

Office Action dated Jan. 9, 2020 in Corresponding U.S. Appl. No. 16/181,957.
Office Action dated Jun. 28, 2019 in Corresponding U.S. Appl. No. 16/181,957.

* cited by examiner

FIG. 7
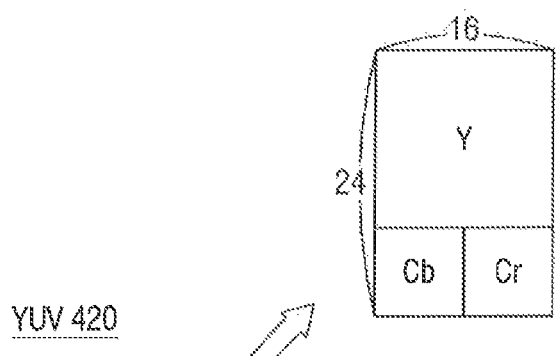
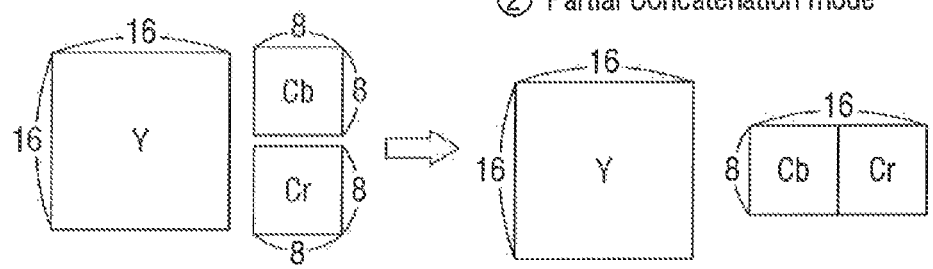
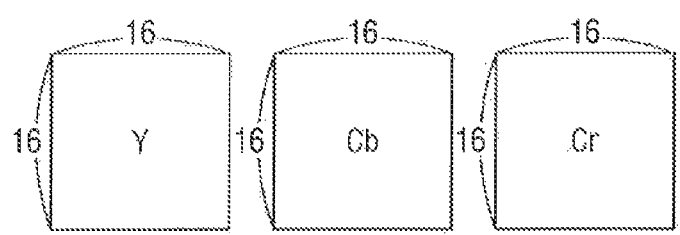

IMAGE PROCESSING DEVICE AND METHOD FOR OPERATING IMAGE PROCESSING DEVICE

CROSS-REFERENCE TO RELATED APPLICATIONS

This application is a continuation application of U.S. patent application Ser. No. 16/181,957 filed Nov. 6, 2018, which claims the benefit of priority under 35 U.S.C. 119 to Korean Patent Application No. 10-2018-0010128, filed on Jan. 26, 2018, and Korean Patent Application No. 10-2018-0041786, filed on Apr. 10, 2018, in the Korean Intellectual Property Office, the disclosures of which are incorporated by reference in their entireties herein.

BACKGROUND

1. Technical Field

The present disclosure relates to an image processing device and a method for operating an image processing device.

2. Discussion of Related Art

More and more applications demand high-definition video images and high-frame rate images. Accordingly, the amount of data accessed from a memory (i.e., the bandwidth) storing these images by various multimedia Intellectual Property (IP) blocks of image processing devices has greatly increased.

Each image processing device has limited processing capability. When the bandwidth increases, the processing capability of the image processing device may reach this limit. Accordingly, a user of the image processing device may experience a decrease in speed while recording or playing a video image.

SUMMARY

An aspect of the present disclosure provides an image processing device that executes compression of image data having excellent compression quality.

Another aspect of the present disclosure provides a method for operating an image processing device that executes compression of image data having excellent compression quality.

According to an aspect of the present disclosure, there is provided an image processing device including a multimedia intellectual property (IP) block configured to process image data including a first component and a second component; a memory; and a frame buffer compressor (FBC) configured to compress the image data to generate compressed data and store the compressed data in the memory, wherein the frame buffer compressor includes a logic circuit configured to control a compression sequence of the first component and the second component of the image data.

According to another aspect of the present disclosure, there is provided an image processing device including a multimedia intellectual property (IP) block configured to process image data conforming to a YUV format; a memory; and a frame buffer compressor (FBC) configured to compress the image data to generate compressed data and store the compressed data in the memory, wherein the frame buffer compressor includes a logic circuit configured to control a compression sequence such that compression of a chroma component including Cb and Cr components of the YUV format of the image data is executed prior to compression of a luma component including Y component of the YUV format of the image data.

According to another aspect of the present disclosure, there is provided a method for operating an image processing device including calculating a total target bit based on a target compression ratio of image data conforming to a YUV format; calculating a chroma component target bit for compressing a chroma component including Cb and Cr components of the YUV format; assigning the chroma component target bit to compress the chroma component; calculating the luma component target bit of the luma component including a Y component of the YUV format, using the chroma component used bit of the compressed data for the chroma component; assigning the luma component target bit to compress the luma component; and adding a dummy bit after the compressed data of the luma component, when the sum of the luma component used bit of the compressed data of the luma component and the chroma component used bit is less than the total target bit.

The aspects the present disclosure are not limited to those mentioned above and another aspect which is not mentioned is clearly understood by a person skilled in the art from the description below.

BRIEF DESCRIPTION OF THE DRAWINGS

The present invention will become more apparent by describing in detail exemplary embodiments thereof with reference to the attached drawings, in which:

FIG. 7 is a conceptual diagram for explaining three operation modes of YUV 420 format data of the image processing device according to an exemplary embodiment of the present inventive concept;

DETAILED DESCRIPTION OF THE EMBODIMENTS

Figure 1:
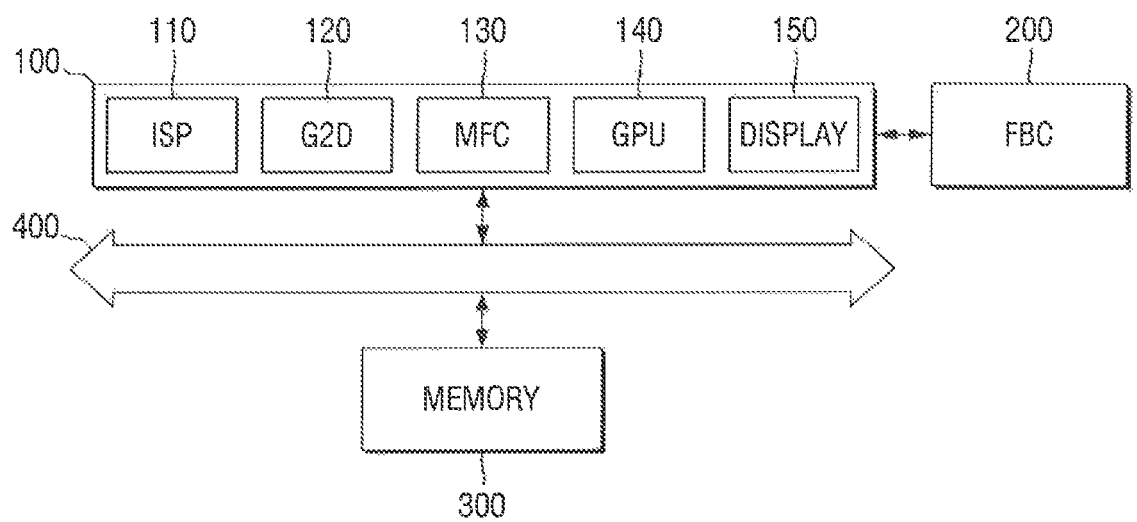
FIGS. 1 to 3 are block diagrams for explaining an image processing device according to some embodiments of the present inventive concept.
Figure 2:
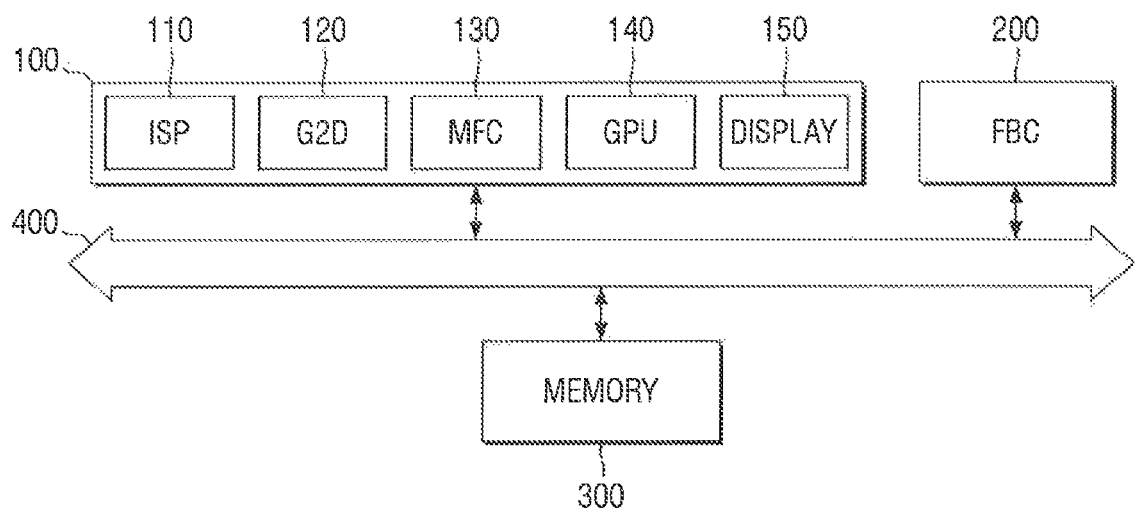
Figure 3:
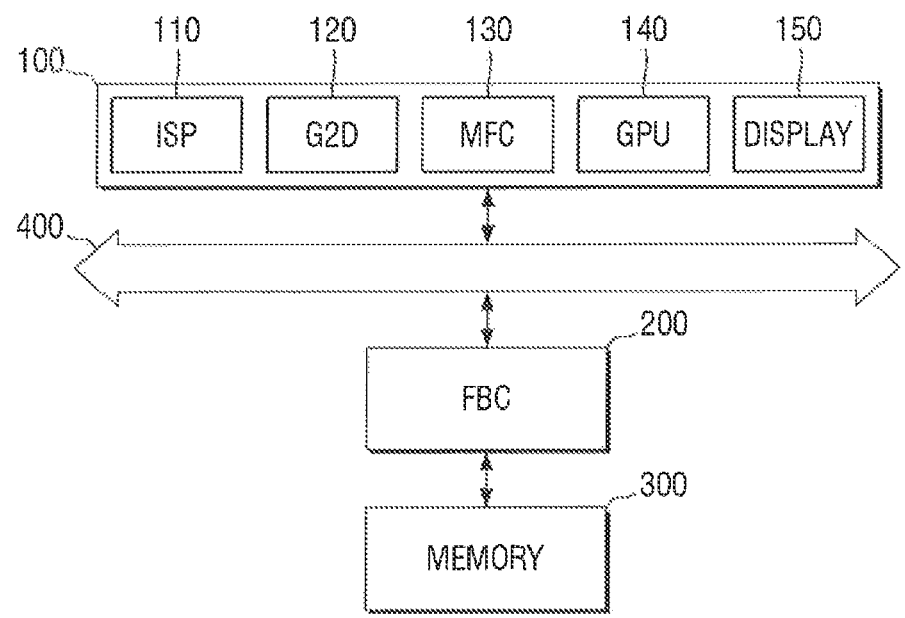

FIGS. 1 to 3 are block diagrams for explaining an image processing device according to an exemplary embodiment of the present inventive concept.

Referring to FIG. 1, the image processing device according to exemplary embodiments of the present inventive concept includes a multimedia IP (Intellectual Property) 100 (e.g., an IP block, and IP core, a circuit etc.), a frame buffer compressor (FBC) 200 (e.g., a circuit, a digital signal processor, etc.), a memory 30, and a system bus 400.

In an embodiment, the multimedia IP 100 is a part of the image processing device that directly executes the image processing of the image processing device. The multimedia IP 100 may include a plurality of modules for recording and reproducing images such as camcoding and playback of video images.

The multimedia IP 100 receives the first data (e.g., image data) from an outside source such as a camera, and converts the first data into second data. For example, the first data may be moving image data or image raw data. The second data is data generated by the multimedia IP 100, and may include data resulting from the multimedia IP 100 processing the first data. The multimedia IP 100 may repeatedly store the second data in the memory 300 and update the second data via various steps. The second data may include all the data used in these steps. The second data may be stored in the memory 300 in the form of third data. Therefore, the second data may be data before stored in the memory 300 or after read from the memory 300. This will be explained in more detail below.

In an exemplary embodiment, the multimedia IP 100 includes an image signal processor ISP 110, a shake correction module G2D 120, a multi-format codec MFC 130, a GPU 140 and a display 150. However, the present inventive concept is not limited thereto. That is, the multimedia IP 100 may include at least one of the image signal processor 110, the shake correction module 120, the multi-format codec 130, the GPU 140 and the display 150. The multimedia IP 100 may be implemented by a processing module (e.g., processor) that accesses the memory 300 in order to process data representing moving or static images.

The image signal processor 110 receives the first data, and pre-processes the first data to convert the first data into the second data. In an exemplary embodiment, the first data is an RGB type image source data. For example, the image signal processor 110 may convert the first data of the RGB type into a second data of the YUV type.

In an embodiment, the RGB type data means a data format which expresses colors on the basis of the three primary colors of light. That is, it is a type that expresses images, using three kinds of colors of red (RED), green (GREEN), and blue (BLUE). In contrast, the YUV type means a data format which separately expresses brightness, that is, a luma signal and a chroma signal. That is, Y means the luma signal, and U(Cb) and V(Cr) mean chroma signals, respectively. U means a difference between the luma signal and the blue signal component, and V means a difference between the luma signal and the red signal component.

The YUV type data may be acquired by converting the RGB type data using a conversion formula. For example, a conversion formula such as $Y=0.3R+0.59G+0.11B$, $U=(B-Y)\times0.493$, $V=(R-Y)\times0.877$ may be used to convert the RGB type data into the YUV type data.

Since human eyes are sensitive to the luma signal but are less sensitive to the color signal, the YUV type data may be more easily compressed than RGB type data. As a result, the image signal processor 110 may convert the first data of the RGB type into the second data of the YUV type.

The image signal processor 110 converts the first data into the second data and then stores the second data in the memory 300.

The shake correction module 120 may perform the shake correction of static image data or moving image data. The shake correction module 120 may perform the shake correction by reading the first data or the second data stored in the memory 300. In an embodiment, the shake correction means the detection of shaking of the camera from the moving image data and removal of the shaking from the moving image data.

The shake correction module 120 may correct the shaking of the first data or the second data to update the first data or the second data and store the updated data in the memory 300.

The multi-format codec 130 may be a codec that compresses the moving image data. In general, since the size of the moving image data is very large, a compression module that reduces its size is necessary. The moving image data may be compressed via association among a plurality of frames, and this compression may be performed by the multi-format codec 130. The multi-format codec 130 may read and compress the first data or the second data stored in the memory 300.

The multi-format codec 130 may compress the first data or the second data to generate new second data or updates the second data to store it in the memory 300.

The GPU (Graphics Processing Unit) 140 may perform arithmetic process and generation of two-dimensional or three-dimensional graphics. The GPU 140 may arithmetically process the first data or the second data stored in the memory 300. The GPU 140 may be specialized for graphic data processing to process the graphic data in parallel.

The GPU 140 may compress the first data or the second data to generate updated first data or updated second data and store the updated data in the memory 300.

The display 150 may display the second data stored in the memory 300 on a screen. The display 150 may display image data processed by components of the multimedia IP 100, that is, the image signal processor 110, the shake correction module 120, the multi-format codec 130 and the GPU 140. However, the present inventive concept is not limited to these examples.

The image signal processor 110, the shake correction module 120, the multi-format codec 130, the GPU 140 and the display 150 of the multimedia IP 100 may individually operate, respectively. That is, the image signal processor 110, the shake correction module 120, the multi-format codec 130, the GPU 140 and the display 150 may individually access the memory 300 to write or read data.

In an embodiment, the frame buffer compressor 200 compresses the second data to convert the second data into the third data before the multimedia IP 100 individually accesses the memory 300. The frame buffer compressor 200 transmits the third data to the multimedia IP 100, and the multimedia IP 100 transmits the third data to the memory 300.

As a result, the third data compressed by the frame buffer compressor 200 is stored in the memory 300. Conversely, the third data stored in the memory 300 may be loaded by the multimedia IP 100 and transmitted to the frame buffer compressor 200. In an embodiment, the frame buffer compressor 200 decompresses the third data to convert the third data into the second data. The frame buffer compressor 200 may transmit the second data (i.e., the decompressed data) to the multimedia IP 100.

In an embodiment, each time the image signal processor 110, the shake correction module 120, the multi-format codec 130, the GPU 140 and the display 150 of the multimedia IP 100 individually access the memory 300, the frame buffer compressor 200 compresses the second data to the third data and transfer it to the memory 300. For example, after one of the components of the multimedia IP 100 generates and stores the second data in the memory 300, the frame buffer compressor 200 can compress the stored data and store the compressed data into the memory 300. In an embodiment, each time a data request is transmitted from the memory 300 to the image signal processor 110, the shake correction module 120, the multi-format codec 130, the GPU 140 and the display 150 of the multimedia IP, the frame buffer compressor 200 decompresses the third data into the second data, and transmits the second data to the image data processor 110, the shake correction module 120, the multi-format codec 130, the GPU 140 and the display 150 of the multimedia IP 100, respectively.

The memory 300 stores the third data generated by the frame buffer compressor 200, and may provide the stored third data to the frame buffer compressor 200 so that the frame buffer compressor 200 can decompress the third data.

In an embodiment, the multimedia IP 100 and the memory 300 are connected to the system bus 400. Specifically, the image signal processor 110, the shake correction module 120, the multi-format codec 130, the GPU 140 and the display 150 of the multimedia IP 100 may be individually connected to the system bus 400. The system bus 400 may be a path through which the image signal processor 110, the shake correction module 120, the multi-format codec 130, the GPU 140, the display 150 and the memory 300 of the multimedia IP 100 transfer data to each other.

The frame buffer compressor 200 is not connected to the system bus 400, and perform the operation of converting the second data into the third data and converting the third data into the second data, when the image signal processor 110, the shake correction module 120, the multi-format codec 130, the GPU 140 and the display 150 of the multimedia IP 100 access the memory, respectively.

Next, referring to FIG. 2, the frame buffer compressor 200 of the image processing device according to an exemplary embodiment of the present inventive concept is directly connected to the system bus 400.

The frame buffer compressor 200 is not directly connected to the multimedia IP 100 and is connected to the multimedia IP 100 via the system bus 400. Specifically, each of the image signal processor 110, the shake correction module 120, the multi-format codec 130, the GPU 140 and the display 150 of the multimedia IP 100 may transmit the data to and from the frame buffer compressor 200 through the system bus 400, and may transmit the data to the memory 300 accordingly.

That is, in the process of compression, each of the image signal processor 110, the shake correction module 120, the multi-format codec 130, the GPU 140 and the display 150 of the multimedia IP 100 may transmit the second data to the frame buffer compressor 200 through the system bus 400. Subsequently, the frame buffer compressor 200 may compress the second data into the third data and transmit the third data to the memory 300 via the system bus 400.

Likewise, even in the process of decompression, the frame buffer compressor 200 may receive the third data stored in the memory 300 via the system bus 400, and may decompress it to the second data. Subsequently, the frame buffer compressor 200 may transmit the second data to each of the image signal processor 110, the shake correction module 120, the multi-format codec 130, the GPU 140 and the display 150 of the multimedia IP 100 via the system bus 400.

Referring to FIG. 3, in an image processing device according to an exemplary embodiment of the present inventive concept, a memory 300 and a system bus 400 are connected to each other via a frame buffer compressor 200.

That is, the memory 300 is not directly connected to the system bus 400 but is connected to the system bus 400 only via the frame buffer compressor 200. Further, the image signal processor 110, the shake correction module 120, the multi-format codec 130, the GPU 140 and the display 150 of the multimedia IP 100 are directly connected to the system bus 400. Therefore, the image signal processor 110, the shake correction module 120, the multi-format codec 130, the GPU 140 and the display 150 of the multimedia IP 100 access the memory 300 only through the frame buffer compressor 200.

In the present specification, the second data is referred to as an image data 10, and the third data is referred to as compressed data 20.

Figure 4:
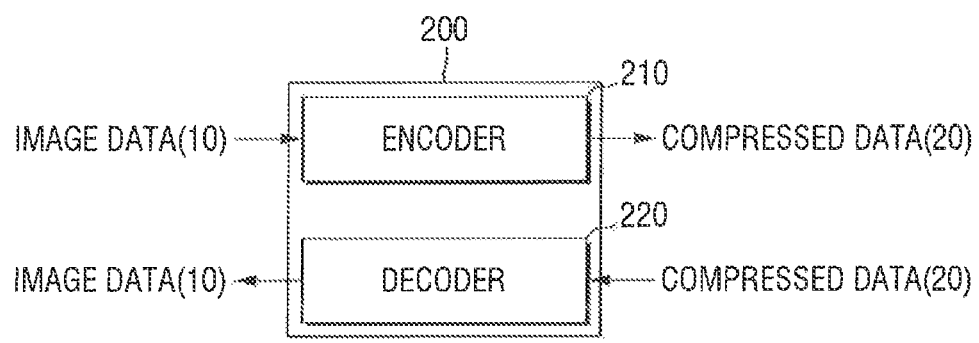
FIG. 4 is a block diagram for explaining the frame buffer compressor of FIGS. 1 to 3 in detail.

FIG. 4 is a block diagram for explaining the frame buffer compressor of FIGS. 1 to 3 in detail.

Referring to FIG. 4, the frame buffer compressor 200 includes an encoder 210 (e.g., an encoding circuit) and a decoder 220 (e.g., a decoding circuit).

The encoder 210 may receive the image data 10 from the multimedia IP 100 to generate the compressed data 20. The image data 10 may be transmitted from each of the image signal processor 110, the shake correction module 120, the multi-format codec 130, the GPU 140 and the display 150 of the multimedia IP 100. The compressed data 20 may be transmitted to the memory 300 via the multimedia IP 100 and the system bus 400.

Conversely, the decoder 220 may decompress the compressed data 20 stored in the memory 300 into the image data 10. The image data 10 may be transferred to the multimedia IP 100. The image data 10 may be transmitted to each of the image signal processor 110, the shake correction module 120, the multi-format codec 130, the GPU 140 and the display 150 of the multimedia IP 100.

Figure 5:
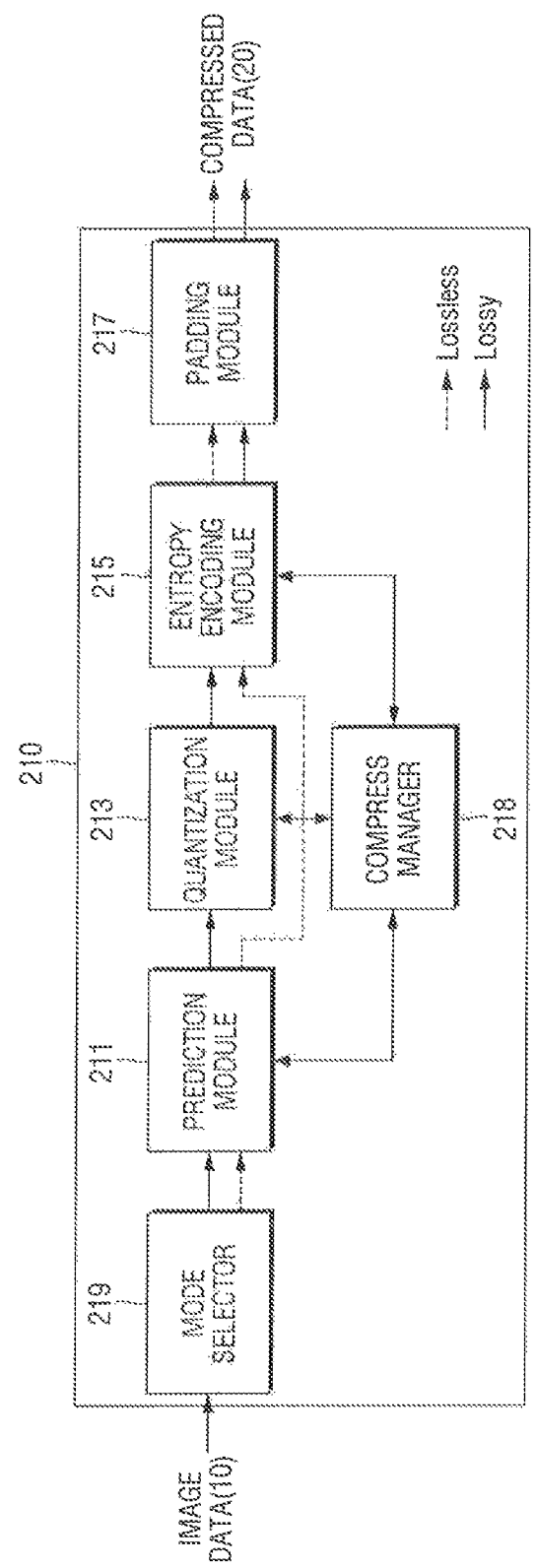
FIG. 5 is a block diagram for explaining an encoder of FIG. 4 in detail.

FIG. 5 is a block diagram for explaining the encoder of FIG. 4 in detail.

Referring to FIG. 5, the encoder 210 includes a first mode selector 219 (e.g., a logic circuit), a prediction module 211 (e.g., a logic circuit), a quantization module 213 (e.g., a logic circuit), an entropy encoding module 215 (e.g., a logic circuit) and a padding module 217 (e.g., a logic circuit).

In an embodiment, the first mode selector 219 determines whether the encoder 210 operates in a lossless mode or a lossy mode. When the encoder 210 operates in the lossless mode in accordance with the first mode selector 219, the image data 10 is compressed along the lossless path (Lossless) of FIG. 5, and when the encoder 210 operates in the lossy mode, the image data 10 is compressed along the lossy path (Lossy).

The first mode selector 219 may receive a signal from the multimedia IP 100 which is used to determine whether to perform the lossless compression or perform the lossy compression. The lossless compression means compression without loss of data. A compression ratio may change depending on the data being losslessly compressed. Unlike lossless compression, the lossy compression is compression in which data is partly lost. The lossy compression has a higher compression ratio than the lossless compression, and may have a fixed compression ratio set in advance.

In the case of the lossless mode, the first mode selector 219 enables the image data 10 to flow along the lossless path (Lossless) to the prediction module 211, the entropy encoding module 215 and the padding module 217. Conversely, in the lossy mode, the first mode selector 219 enables the image data 10 to flow along the lossy path (Lossy) to the prediction module 211, the quantization module 213 and the entropy encoding module 215.

The prediction module 211 may compress the image data 10 by dividing the image data 10 into prediction data and residual data. The prediction data and the residual data together take up less space than the image data 10. In an embodiment, the prediction data is image data of one pixel of the image data and the residual data is created from the differences between the prediction data and the image data of the pixels of the image data that are adjacent the one pixel. For example, if the image data of the one pixel has a value between 0 and 255, 8 bits may be needed to represent this value. When the adjacent pixels have similar values to that of the one pixel, the residual data of each of the adjacent pixels is much smaller than prediction data, and thus the number of data bits of representing the image data may be greatly reduced. For example, when pixels having values of 253, 254, and 255 are consecutive, if the prediction data is set as 253, the residual data representation of (253 (prediction), 1 (residue), and 2 (residue)) is sufficient, and the number of bits per pixel for expressing these residual data may greatly decreased from 8 bits to 2 bits. For example, 24 bits of data of 253, 254, and 255 can be reduced to 12 bits due to 8 bit prediction data of 253 (11111101), 2 bit residual data of 254−251=1 (01), and 2 bit residual data of 255−253=2 (10).

Therefore, the prediction module 211 may compress the overall size of the image data 10 by dividing the image data 10 into the prediction data and the residual data. Various methods are available for setting the type of the prediction data.

The prediction module 211 may perform prediction on a pixel basis or may perform prediction on a block basis. In this case, the block may mean a region formed by a plurality of adjacent pixels. For example, prediction on a pixel basis could mean that all the residual data is created from one of the pixels, and prediction on the block basis could mean that residual data is created for each block from a pixel of the corresponding block.

The quantization module 213 may further compress the image data 10 that was compressed by the prediction module 211. In an exemplary embodiment, the quantization module 213 removes the lower bits of the image data 10 through the preset quantization coefficient. Specifically, the representative value is selected by multiplying the data by the quantization coefficient, but a loss may occur by truncating the decimal part. If the value of the pixel data is between 0 and $2^8-1$ (=255), the quantization coefficient may be defined as/($2^n-1$)12(n−1) (where, n is an integer equal to or less than 8). However, the present embodiment is not limited thereto. For example, if the prediction data is 253 (11111101), the prediction data can be reduced from 8 bits to 6 bits by removing the lower 2 bits, which results in prediction data of (111111) 252.

However, the removed lower bits are not restored later and thus are lost. Therefore, the quantization module 213 is utilized only in the lossy mode. However, since the lossy mode has compression ratio relatively higher than that in the lossless mode and may have a fixed compression ratio set in advance, information on the compression ratio is not separately required later.

The entropy encoding module 215 may compress the image data 10 compressed by the quantization module 213 in the lossy mode or the image data 10 compressed by the prediction module 211 in the lossless mode through entropy coding. In an embodiment, the entropy coding utilizes a method for assigning a number of bits depending on the frequency.

In an exemplary embodiment, the entropy encoding module 215 compresses the image data 10, using Huffman coding. In an alternative embodiment, the entropy encoding module 215 compresses the image data 10 via exponential golomb coding or golomb rice coding. In an exemplary embodiment, the entropy encoding module 215 determines an entropy coding value (e.g., a k value) from the data it is to be compress, creates a table from the value of k and compresses the image data 10 using the table.

The padding module 217 may perform padding on the image data 10 compressed by the entropy encoding module 215 in the lossless mode. Here, the padding may mean addition of meaningless data to match a specific size. This will be explained in more detail below.

The padding module 217 may be enabled not only in the lossless mode but also in the lossy mode. In the lossy mode, the image data 10 may be compressed further than the desired compression ratio when compressed by the quantization module 213. In such a case, even in the lossy mode, the image data 10 may be converted into the compressed data 20 via the padding module 217 and transmitted to the memory 300. In an exemplary embodiment, the padding module 217 is omitted so that no padding is performed.

The compression management module 218 controls the compression sequence of the first component and the second component of the image data 10. Here, the image data 10 may be image data conforming to the YUV format.

In this case, the first mode selector 219 determines that the encoder 210 operates in the lossy mode, and the image data 10 is compressed along the lossy path (Lossy) of FIG. 5 accordingly. That is, the configuration in which the compression management module 218 controls the compression sequence of the first component and the second component of the image data 10 is premised on the case where the frame buffer compressor 200 compresses the image data 10 using a lossy compression algorithm.

Specifically, the image data 10 may include a first component and a second component. Here, the first component may include, for example, a Luma component (corresponding to the aforementioned "luminance signal") including the Y component of the YUV format, and the second component may include, for example, a Chroma component (corresponding to the aforementioned "color difference signal") including Cb and Cr components of the YUV format.

The compression management module 218 determines the compression sequence of the first component and the second component of the image data 10, and the frame buffer compressor 200 decompresses the first component and the second component in accordance with the compression sequence determined by the compression management module 218.

That is, if the compression management module 218 determines the compression sequence of the first component and the second component of the image data 10, the frame buffer compressor 200 compresses the image data 10 in accordance with the compression sequence, using of the prediction module 211, the quantization module 213 and the entropy encoding module 215 of the encoder 210.

Thereafter, the frame buffer compressor 200 merges the compressed data of the first component and the compressed data of the second component to generate a single bit stream, and may write the generated single bit stream to the memory 300. Also, the frame buffer compressor 200 may read a single bit stream from the memory 300, and may decompress the read single bit stream to provide the decompressed data to the multimedia IP 100.

More details of the compression management module 218 for executing such an operation will be described later with reference to FIGS. 9 to 15.

Figure 6:
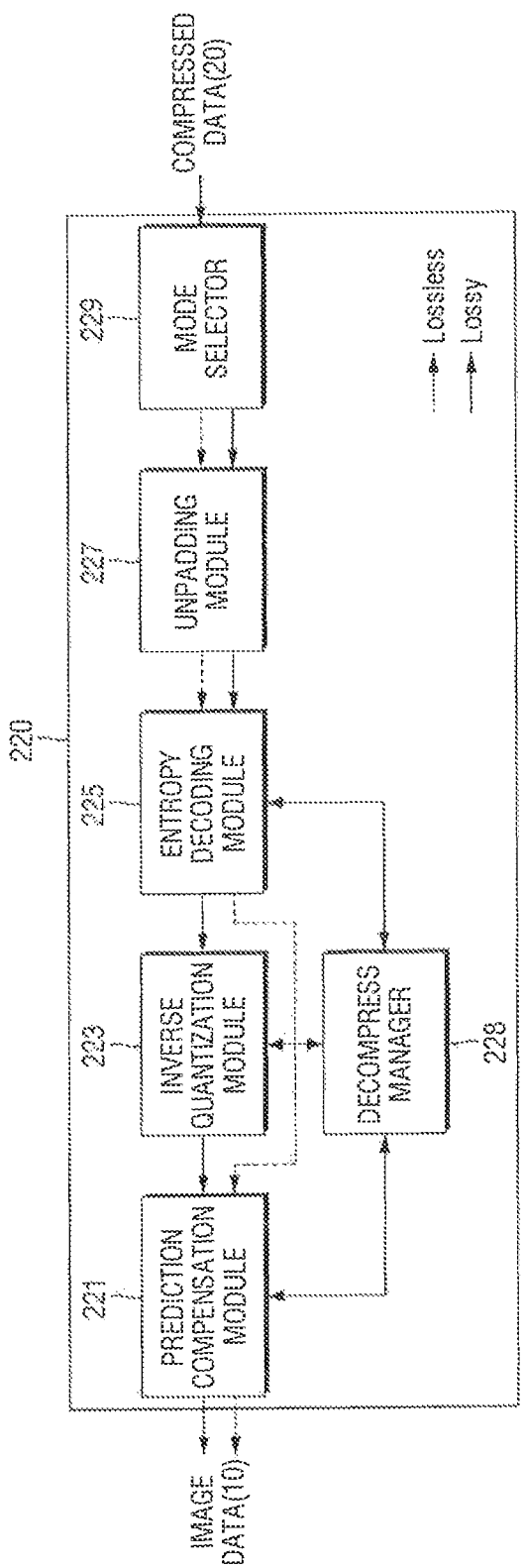
FIG. 6 is a block diagram for explaining a decoder of FIG. 4 in detail.

FIG. 6 is a block diagram for explaining the decoder of FIG. 4 in detail.

Referring to FIG. 6, the decoder 220 includes a second mode selector 229 (e.g., a logic circuit), an unpadding module 227 (e.g., a logic circuit), an entropy decoding module 225 (e.g., a logic circuit), an inverse quantization module 223 (e.g., a logic circuit), and a prediction compensation module 221 (e.g., a logic circuit).

The second mode selector 229 determines whether or not the compressed data 20 stored in the memory 300 has been compressed in a lossless manner or a lossy manner. In an exemplary embodiment, the second mode selector 229 determines whether the compressed data 20 has been compressed by the lossless mode or the lossy mode through the presence or absence of the header. This will be explained in more detail below.

In the case of the lossless mode, the second mode selector 229 enables the compressed data 20 flow along the lossless path (Lossless) to the unpadding module 227, the entropy decoding module 225 and the prediction compensation module 221. Conversely, in the case of the lossy mode, the second mode selector 229 enables to flow along the lossy path (Lossy) to the compressed data 20 to the entropy decoding module 225, the inverse quantization module 223 and the prediction compensation module 221.

The unpadding module 227 removes the padded portion of the data which is padded by the padding module 217 of the encoder 210. The unpadding module 227 may be omitted when the padding module 217 is omitted.

The entropy decoding module 225 may decompress the data compressed by the entropy encoding module 215. The entropy decoding module 225 may perform the decompression via Huffman coding, exponential golomb coding or golomb rice coding. Since the compressed data 20 includes the k value, the entropy decoding module 225 may perform the decoding, using the k value.

The inverse quantization module 223 may decompress the data compressed by the quantization module 213. The inverse quantization module 223 may restore the compressed data 20 compressed using the quantization coefficient determined by the quantization module 213, but it is not possible to completely restore the part which is lost in the process of compression Therefore, the inverse quantization module 223 is utilized only in the lossy mode.

The prediction compensation module 221 may restore the data represented by the prediction data and the residual data generated by the prediction module 211. The prediction compensation module 221 may, for example, convert the residual data representation of (253 (prediction), 1 (residue), and 2 (residue)) into 253, 254, and 255. For example, the prediction compensation module 221 may restore the data by adding the residual data to the prediction data.

The prediction compensation module 221 may restore the prediction executed in units of pixels or blocks in accordance with the prediction module 211. As a result, the compressed data 20 may be restored or decompressed and may be transmitted to the multimedia IP 100.

The decompression management module 228 may perform a work in which the combination sequence of the first component and the second component determined by the compression management module 218 described above referring FIG. 5 to execute the compression of the image data 10 can be properly reflected when decompressing the compressed data 20.

The image data 10 of the image processing device according to an exemplary embodiment of the present inventive concept is YUV type data. For example, the YUV type data may have a YUV 420 format or a YUV 422 format.

FIG. 7 is a conceptual diagram for explaining three operation modes of YUV 420 format data of the image processing device according to an exemplary embodiment of the present inventive concept.

Referring to FIGS. 1 to 7, the encoder 210 and the decoder 220 of the frame buffer compressor 200 may have three operation modes. The image data 10 of the YUV 420 format may have a luminance signal block Y of 16×16 size, and a first color difference signal block Cb or U and a second color difference signal block Cr or V of each of 8×8 sizes. Here, the size of each block means whether to include pixels arranged in several rows and columns, and the size of 16×16 means the size of the block constituted by the plurality of pixels with 16 rows and 16 columns.

The frame buffer compressor 200 may include three operation modes of (1) a concatenation mode, (2) a partial concatenation mode, and (3) a separation mode. These three modes relate to compression formats of the data and may be operation modes determined separately from the lossy mode and the lossless mode.

First, the concatenation mode (1) is an operation mode of compressing and decompressing all the luminance signal blocks Y, the first color difference signal block Cb and the second color difference signal block Cr. That is, as illustrated in FIG. 5, in the concatenation mode (1), the unit block of compression is a block in which the luminance signal block Y, the first color difference signal block Cb and the second color difference signal block Cr are combined. Therefore, the size of the unit block of compression may be 16×24. For example, in the concatenation mode, all of the blocks (e.g., the Y block, the Cb block, and the Cr block) are combined into a single larger block, and a single compression operation is performed on the single larger block.

In the partial concatenation mode (2), the luminance signal block Y is separately compressed and decompressed, but the first color difference signal block Cb and the second color difference signal block Cr are combined with each other and may be compressed and decompressed together. As a result, the luminance signal block Y is 16×16 in its original size, and the block in which the first color difference signal block Cb and the second color difference signal block Cr are combined is be 16×8. For example, in the partial concatenation mode, the b block and the 8×8 Cb block are combined into a second block, a first compression operation is performed on the Y block and a second compression operation is separately performed on the second block.

The separation mode (3) is an operation mode of separately compressing and decompressing all the luminance signal block Y, the first color difference signal block Cb and the second color difference signal block Cr. For example, in the separation mode, a first compression operation is performed on the Y block, a second compression operation is performed on the Cb block, and a third compression operation is performed on the Cr block. In an exemplary embodiment, in order to make the sizes of the unit blocks of compression and decompression the same, the luminance signal block Y is held at the original size of 16×16, but the first color difference signal block Cb and the second color difference signal block Cr are increased to the size of 16×16.

For example, a magnification operation may be performed on the Cb block and Cr block to make them the same size as the Y block.

As a result, if the number of blocks Y of the luminance signal is N, the number of the first color difference signal block Cb and the number of the second color difference signal block Cr may be reduced to N/4, respectively.

When the frame buffer compressor 200 of the image processing device according to an exemplary embodiment of the present inventive concept is operating in the concatenation mode (1), all the required data may be read through a single access request to the memory 300. In particular, when the RGB type data rather than the YUV type data is required in the multimedia IP 100, the frame buffer compressor 200 may be operate more efficiently in the concatenation mode (1). This is because it is possible to acquire the luminance signal block Y, the first color difference signal block Cb and the second color difference signal block Cr at a same time in the concatenation mode (1), and in order to acquire the RGB data, all the luminance signal block Y, the first color difference signal block Cb and the second color difference signal block Cr are required.

The separation mode (3) may require lower hardware resources when the compression unit block becomes smaller than in the concatenation mode (1). Therefore, when the YUV type data rather than the RGB type is required in the multimedia IP 100, the frame buffer compressor 200 may be operate more efficiently in the separation mode (3).

Finally, the partial concatenation mode (2) is a mode in which there is a compromise between the concatenation mode (1) and the separation mode (3). The partial concatenation mode (2) requires lower hardware resources than the concatenation mode (1), even when the RGB data is required. In the partial concatenation mode (2), the access request to the memory 300 can be made with a smaller number of times (twice) than in the separation mode (3).

The first mode selector 219 may choose to compress the image data 10 in any mode among the three modes, that is, the concatenation mode (1), the partial concatenation modes (2) or the separation mode (3). The first mode selector 219 may receive a signal from the multimedia IP 100 indicating the frame buffer compressor 200 is to operate in a given one of the available modes of the concatenation mode (1), the partial concatenation mode (2) and the separation mode (3).

The second mode selector 229 may decompress the compressed data 20 depending on the compressed mode of the first mode selector 219, among the concatenation mode (1), the partial concatenation mode (2), and the separation mode (3). For example, if the frame buffer compressor 200 was recently used to compress data in the partial concatenation mode (2), the second mode selector 229 could assume data it is to decompress was compressed using the partial concatenation mode (2).

Figure 8:
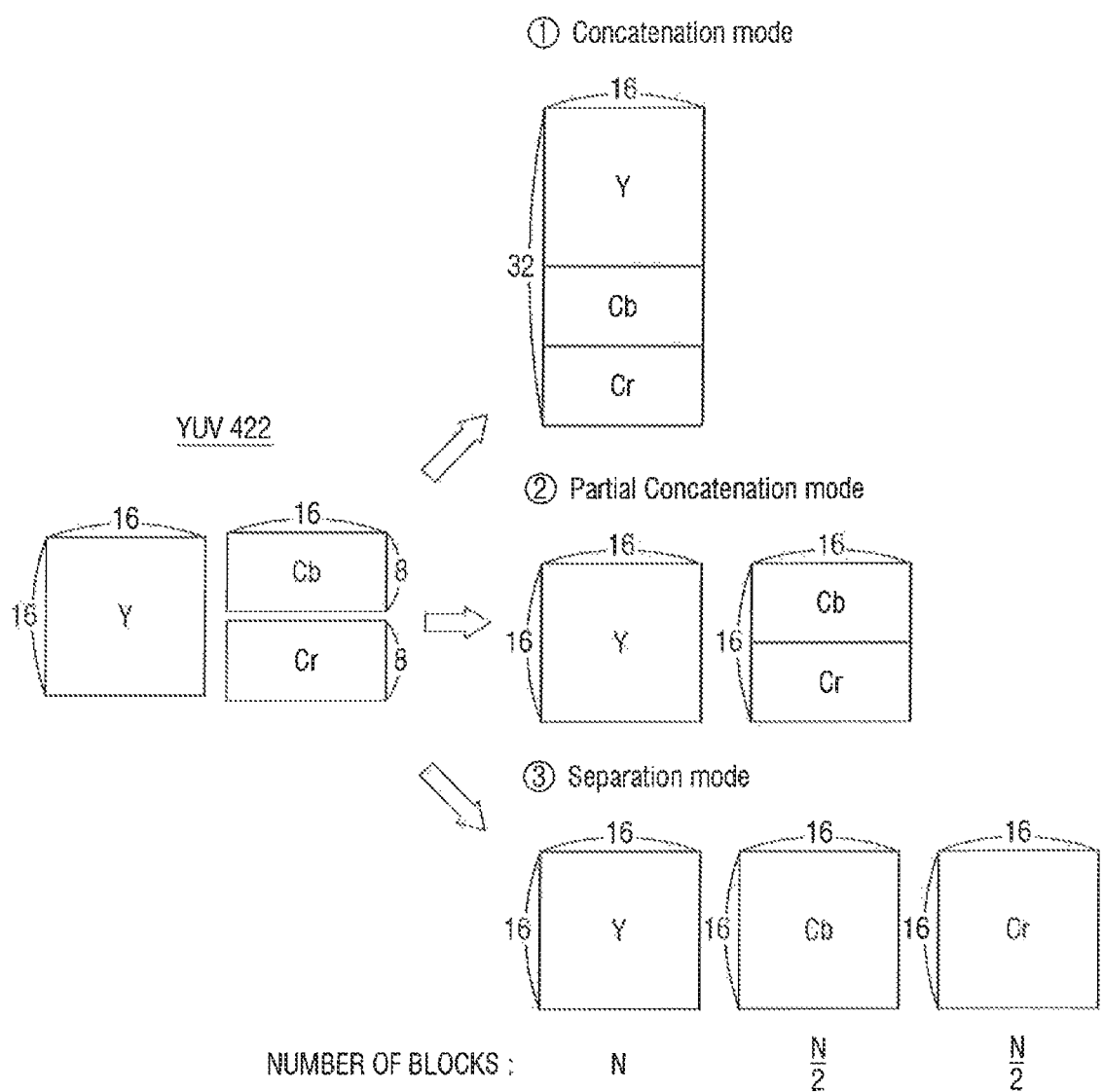
FIG. 8 is a conceptual diagram for explaining three operation modes of YUV 422 format data of the image processing device according to an exemplary embodiment of the present inventive concept.

FIG. 8 is a conceptual diagram for explaining three operation modes of YUV 422 format data of the image processing device according to an exemplary embodiment of the present inventive concept.

Referring to FIGS. 1 to 6 and 8, the encoder 210 and the decoder 220 of the frame buffer compressor 200 also have three operation modes in the YUV 422 format. The image data 10 of the YUV 422 format may have a luminance signal block Y of 16×16 size, and the first color difference signal blocks (Cb or U) and the second color difference signal blocks (Cr or V) of each of 16×8 size.

In the concatenation mode (1), the unit block of compression is a block in which the luminance signal block Y, the first color difference signal block Cb and the second color difference signal block Cr are combined into a single larger block. As a result, the size of the unit block of compression may be 16×32.

In the partial concatenation mode (2), the luminance signal block Y is separately compressed and decompressed, but the first color difference signal block Cb and the second color difference signal block Cr are combined with each other and compressed and decompressed together. As a result, the luminance signal block Y is held at its original size of 16×16, and the block in which the first color difference signal block Cb and the second color difference signal block Cr are coupled may be 16×16. Therefore, the size of the block in which the luminance signal block Y, the first color difference signal block Cb and the second color difference signal block Cr are combined may be the same.

The separation mode (3) is an operation mode for separately compressing and decompressing all the luminance signal block Y, the first color difference signal block Cb and the second color difference signal block Cr. In an embodiment, in order to make the size of the unit block of compression and decompression the same, the luminance signal block Y is held at the original size of 16×16, but the first color difference signal block Cb and the second color difference signal block Cr are increased to the size of 16×16.

As a result, when the number of luminance signal blocks Y is N, the number of the first color difference signal blocks Cb and the number of the second color difference signal blocks Cr may be reduced to N/2, respectively.

The operation of the above-described image processing device will now be described with reference to FIGS. 9 to 15. The operation of the image processing device described below may be executed in the concatenation mode (1) described above with reference to FIGS. 7 and 8.

Figure 9:
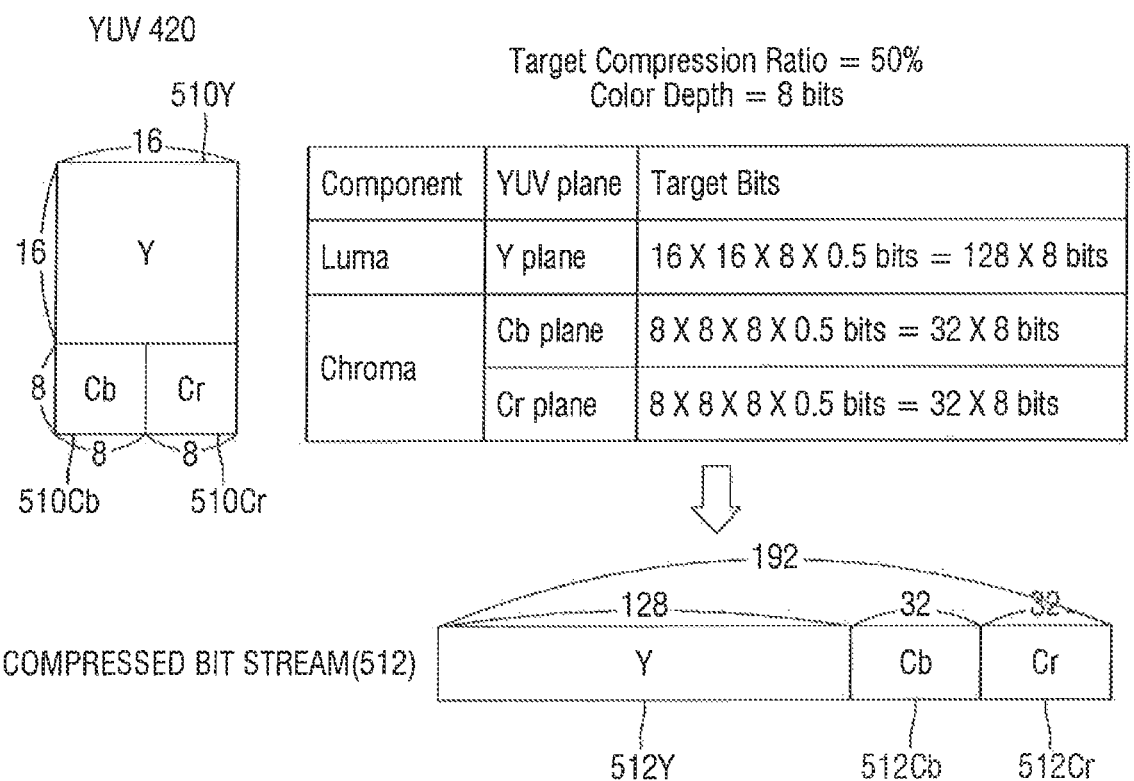
FIGS. 9 to 11 are schematic views for explaining the operation of an image processing device for YUV 420 format data according to an exemplary embodiment of the present inventive concept.
Figure 10:
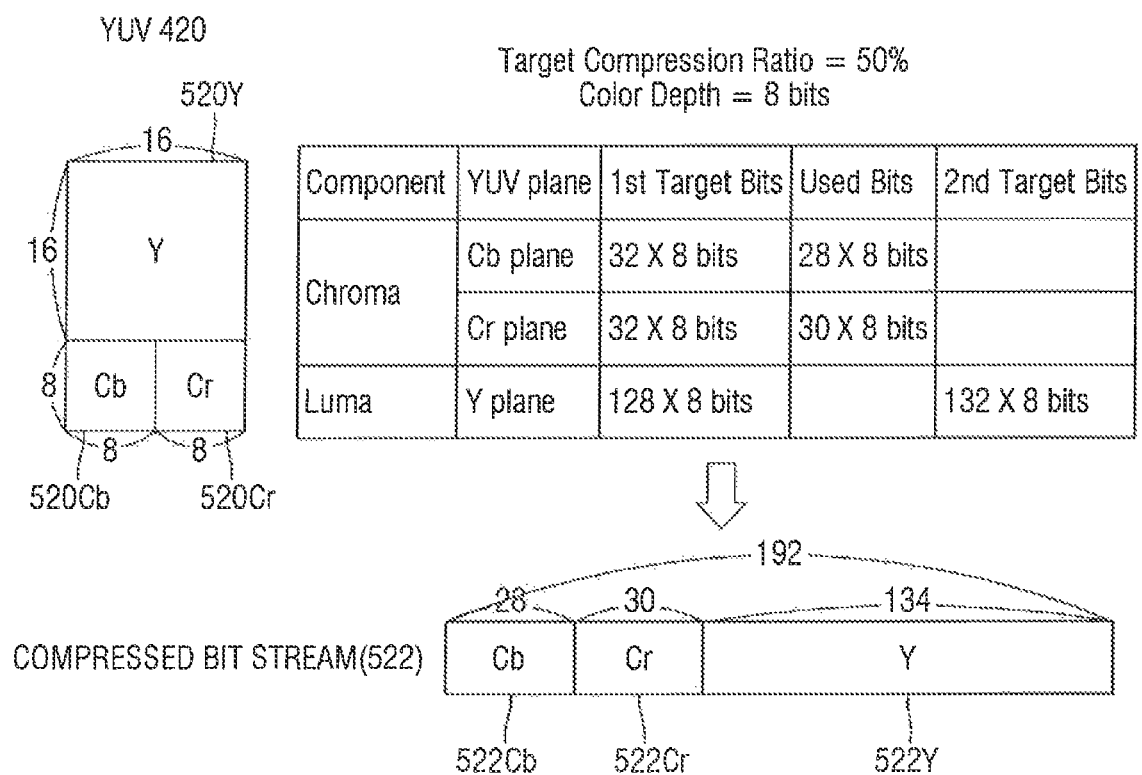
Figure 11:
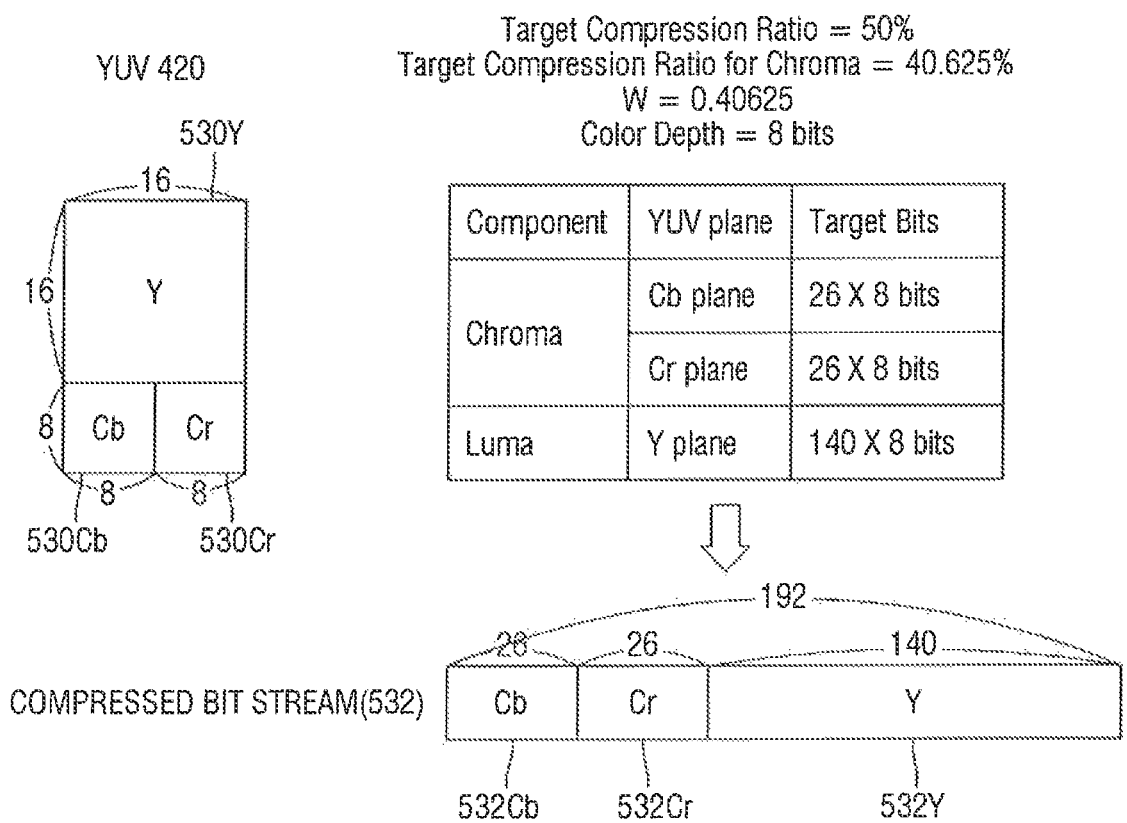

FIGS. 9 to 11 are schematic views for explaining the operation of the image processing device for the YUV 420 format data according to an exemplary embodiment of the present inventive concept.

FIGS. 9 and 10 illustrate a case where, when the image data 10 conforms to the YUV 420 format, the target compression ratio of the image data 10 is 50% and the color depth is 8 bits.

Referring to FIG. 9, the first component of the image data 10, that is, the luma component corresponds to the Y plane 510Y of the image data 10, and the second component of the image data 10, that is, the chroma components correspond to the Cb plane 510Cb and the Cr plane 510Cr of the image data 10.

In the case of the Y plane 510Y, since the target compression ratio is 50% and the color depth is 8 bits, the luma component target bit may be calculated as follows.

The luma component target bit=16×16×8×0.5 bit=128×8 bits

In the case of the Cb plane 510Cb and the Cr plane 510Cr, the Cb plane component target bit and the Cr plane component target bit may be calculated as follows.

Cb plane component target bit=8×8×8×0.5 bit=32×8 bits

Cr plane component target bit=8×8×8×0.5 bit=32×8 bits

As a result, the chroma component target bit obtained by combining the Cb plane component target bit and the Cr plane component target bit is 64×8 bits.

When the luma component and the chroma component are compressed on the basis of the target bit calculated in this manner, both the luma component and the chroma component are compressed at the same compression ratio of 50%.

The compressed bit stream 512 corresponding to the compression result may be formed as a single bit stream having, for example, the sequence of a Y component bit stream 512Y, a Cb component bit stream 512Cb, and a Cr component bit stream 512Cr. However, the scope of the present inventive concept is not limited thereto, and the frame buffer compressor 200 may generate a compressed bit stream 512, by merging the compressed data of the first component and the compressed data of the second component in an arbitrary sequence different from the compression sequence of the first component (e.g., luma component) and the second component (e.g., chroma component). That is, the sequence of the Y component bit stream 512Y, the Cb component bit stream 512Cb and the Cr component bit stream 512Cr in the compressed bit stream 512 may be different from that illustrated in FIG. 9.

In an exemplary embodiment of the present inventive concept, the frame buffer compressor 200 interleaves and merges the compressed data of the first component and the compressed data of the second component to generate a compressed bit stream 512. That is, the Y component bit stream 512Y, the Cb component bit stream 512Cb, and the Cr component bit stream 512Cr may be generated in the compressed bit stream 512, for example, in the form in which the bit streams of Y, Cb, and Cr components repeated in units of pixels of the image data 10 are mixed in an arbitrary sequence.

For example, the compressed bit stream 512 may be interleaved and merged in the sequence in which a Y component bit stream of the first pixel of the image data 10, a Cb component bit stream of the first pixel, a Cr component bit stream of the first pixel, a Y component bit stream of the second pixel of the image data, a Cb component bit stream of the second pixel, and a Cr component bit stream of the second pixel are connected, and the interleaving sequence of the Y, Cb, and Cr components may also be determined in an arbitrary sequence.

In general, human eyes are more sensitive to changes in brightness than color. Therefore, in the image data 10 according to the YUV format, the importance of the luma component may be higher than the chroma component.

However, when compressing the image data 10 according to the YUV format, since the pixel correlation of the chroma component is higher than the luma component, prediction is made easier, and thus, the compression efficiency of the chroma component becomes higher than the luma component.

Therefore, in order to further improve the compression quality of the compressed data 20 obtained by compressing the image data 10, a method of comparatively improving the compression ratio can be applied by assigning more bits than the chroma component with good compression efficiency to the luma component with lower compression efficiency.

Referring to FIG. 10, the first component of the image data 10, that is, the luma component corresponds to the Y plane 520Y of the image data 10, and the second component of the image data, i.e., the chroma component corresponds to the Cb plane 520Cb and the Cr plane 520Cr of the image data 10.

In this embodiment, the compression management module 218 controls the compression sequence so that the frame buffer compressor 200 compresses the chroma component first and then compresses the luma component. To this end, the compression management module 218 calculates the chroma component target bit before calculating the luma component target bit.

In the case of the Cb plane 520Cb and the Cr plane 520Cr, each of the Cb plane component target bit and the Cr plane component target bit may be calculated as follows.

Cr plane component target bit=8×8×8×0.5 bit=32×8 bits

Cr plane component target bit=8×8×8×0.5 bit=32×8 bits

The compression management module 218 allocates the chroma component target bit to first perform compression on the chroma component, before calculating the luma component target bit. Specifically, the compression management module 218 determines a quantization parameter (QP) value and the entropy k value so that the chroma component used bit is a value smaller than and closest to the chroma target bit, thereby performing the compression on the chroma component.

As a result, let us assume that 28×8 bits are used for compression on the Cb plane component and 30×8 bits are used for compression on the Cb plane component. That is, in the present embodiment, the chroma component used bit ((28+30)×8 bits) is smaller than the chroma component target bit ((32+32)×8 bits).

The compression management module 218 calculates the luma component target bit on the luma component, using the chroma component used bit of the compressed data on the chroma component.

The compression management module 218 may calculate the luma component target bit as follows.

Luma component target bit=total target bit−chroma component used bit=192×8 bits−(28+30)×8 bits=132×8 bits Here, the total target bit is a value obtained by multiplying the size of total (16+8)×16×0.5=192 by the color depth value 8, in the case of the Y plane (520Y) of 16×16 size, the Cb plane (520Cb) of 8×8 size, and the Cr plane (520Cr) of 8×8 size. Further, 0.5 means the target compression ratio.

The compression management module 218 allocates the luma component target bit thus calculated to compress the luma component.

According to this embodiment, unlike the compressed bit stream 512 including the Y component bit stream 512Y of 128 bits, the Cb component bit stream 512Cb of 32 bits, and Cr component bit stream 512Cr of 32 bits of FIG. 9, the compressed bit stream 522 including the Cb component bit stream 522Cb of 28 bits, the Cr component bit stream 522Cr of 30 bits and the Y component bit stream 522Y of 134 bits becomes the compression result.

As described above, the frame buffer compressor 200 may generate a compressed bit stream 522, by merging the compressed data of the first component and the compressed data of the second component in an arbitrary sequence difference from the compression sequence of the first component (e.g., luma component) and the second component (e.g., chroma component). That is, the sequence of the Y component bit stream 522Y, the Cb component bit stream 522Cb, and the Cr component bit stream 522Cr in the compressed bit stream 522 may be different from that illustrated in FIG. 10.

In an exemplary embodiment of the present inventive concept, the frame buffer compressor 200 interleaves and merges the compressed data of the first component and the compressed data of the second component to generate a compressed bit stream 522. That is, in the compressed bit stream 522, the Y component bit stream 522Y, the Cb component bit stream 522Cb, and the Cr component bit stream 522Cr may be generated, for example, in the form in which the bit streams of Y, Cb, and Cr components repeated in units of pixels of the image data 10 are mixed in an arbitrary sequence. In this way, within the same total target bit, by assigning more bits to luma components having a higher importance and relatively lower compression efficiency, and by assigning fewer bits to the relatively different chroma components, the compression quality of the compressed data 20 obtained by compressing the image data 10 can be improved.

Next, referring to FIG. 11, the first component of the image data 10, that is, the luma component corresponds to the Y plane 530Y of the image data 10, and the second component of the image data 10, that is, the chroma component corresponds to the Cb plane 530 Cb and the Cr plane 530Cr of the image data 10.

In this embodiment, the compression management module 218 controls the compression sequence so that the frame buffer compressor 200 compresses the chroma component first and then compresses the luma component. To this end, the compression management module 218 calculates the chroma component target bit, before calculating the luma component target bit. However, the difference from the embodiment of FIG. 10 is that the compression management module 218 can previously set the compression ratio for the chroma component to, for example, 40.625% smaller than 50%.

Accordingly, in the case of the Cb plane 530Cb and the Cr plane 530Cr, the Cb plane component target bit and the Cr plane component target bit can be calculated as follows.

Cb plane component target bit=8×8×8×0.40625 bit=26×8 bits

Cr plane component target bit=8×8×8×0.40625 bit=26×8 bits

The compression management module 218 first performs compression on the chroma component in accordance with the compression ratio set in advance to, for example, 40.625%. Specifically, the compression management module 218 determines the QP value and the entropy k value to conform to the preset compression rate, and performs compression on the chroma component. As a result, 26×8 bits are used for compression of the Cb plane component and 26×8 bits are used for compression of the Cb plane component.

The compression management module 218 may calculate the luma component target bit as follows.

Luma component target bit=total target bit−chroma component target bit according to preset compression ratio=192×8 bits−(26+26)×8 bits=140×8 bits Here, the total target bit is a value obtained by multiplying the size of total (16+8)×16×0.5=192 by the color depth value 8, in the case of the Y plane (530Y) of 16×16 size, the Cb plane (530Cb) of 8×8 size, and the Cr plane (530Cr) of 8×8 size. Further, 0.5 means the target compression ratio.

The compression management module 218 allocates the luma component target bit thus calculated to compress the luma component.

Thus, in at least one embodiment of the present inventive concept, when the image data 10 conforms to the YUV 420 format, the chroma component target bit may be calculated to the total target bit/3 XW by the compression management module 218 (here, W is a positive real number equal to or less than 1). For example, the embodiment of FIG. 11 illustrates a case where the value of W is 0.40625.

According to this embodiment, unlike the compressed bit stream 512 including the Y component bit stream 512Y of 128 bits, the Cb component bit stream 512Cb of 32 bits, and the Cr component bit stream 512Cr of 32 bits of FIG. 9, the compressed bit stream 532 including the bit Cb component bit stream 532Cb of 26 bits, the Cr component bit stream 532Cr of 26 bits, and the Y component bit stream 522Y of 140 bits becomes the compression result.

As described above, the frame buffer compressor 200 may generate the compressed bit stream 532, by merging the compressed data of the first component and the compressed data of the second component, in an arbitrary sequence different from the compression sequence of the first component (e.g., luma component) and the second component (e.g., chroma component). That is, the sequence of the Y component bit stream 532Y, the Cb component bit stream 532Cb and the Cr component bit stream 532Cr in the compressed bit stream 532 may be different from that illustrated in FIG. 11.

In an exemplary embodiment of the present inventive concept, the frame buffer compressor 200 generates the compressed bit stream 532, by interleaving and merging the compressed data of the first component and the compressed data of the second component. That is, the Y component bit stream 532Y, the Cb component bit stream 532Cb, and the Cr component bit stream 532Cr may be generated within the compressed bit stream 532, for example, in the form in which the bit streams of Y, Cb, and Cr components repeated in units of pixels of the image data 10 are mixed in an arbitrary sequence.

As described above, within the same total target bit, by assigning more bits to the luma components with higher importance to have a relatively lower compression efficiency, and by assigning fewer bits of the relatively different chroma components, the compression quality of the compressed data 20 obtained by compressing the image data 10 may be improved.

Figure 12:
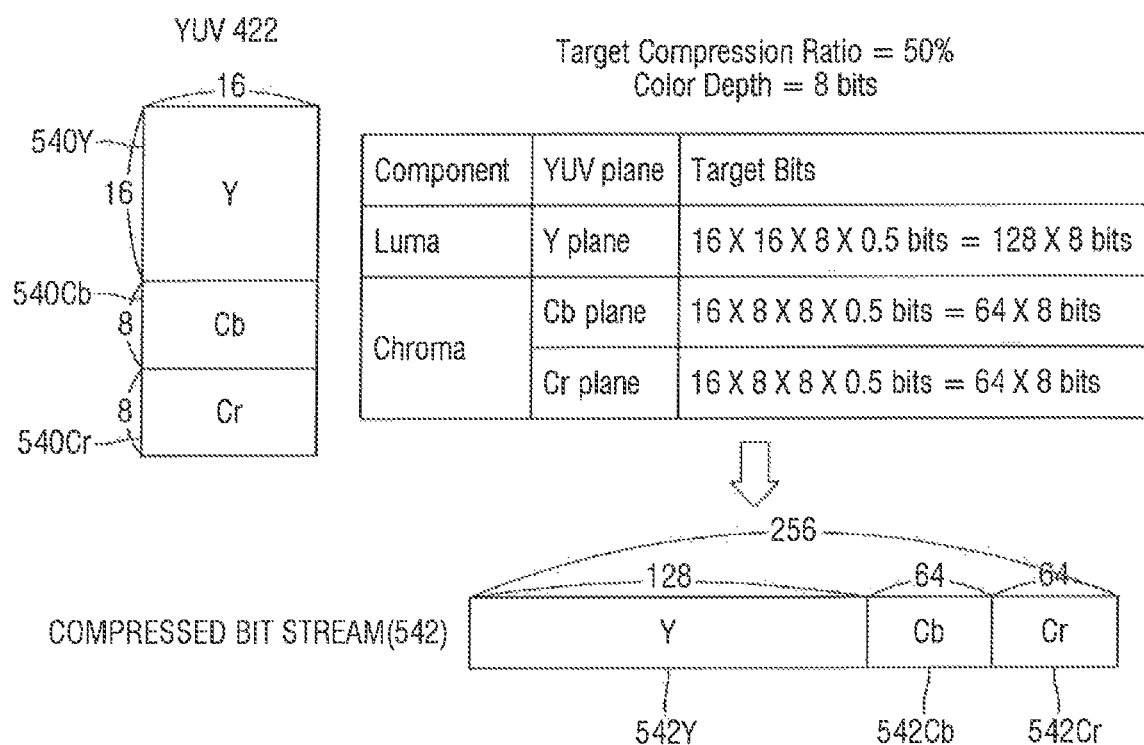
FIGS. 12 to 14 are schematic views for explaining the operation of an image processing device for YUV 422 format data according to an exemplary embodiment of the present inventive concept.
Figure 13:
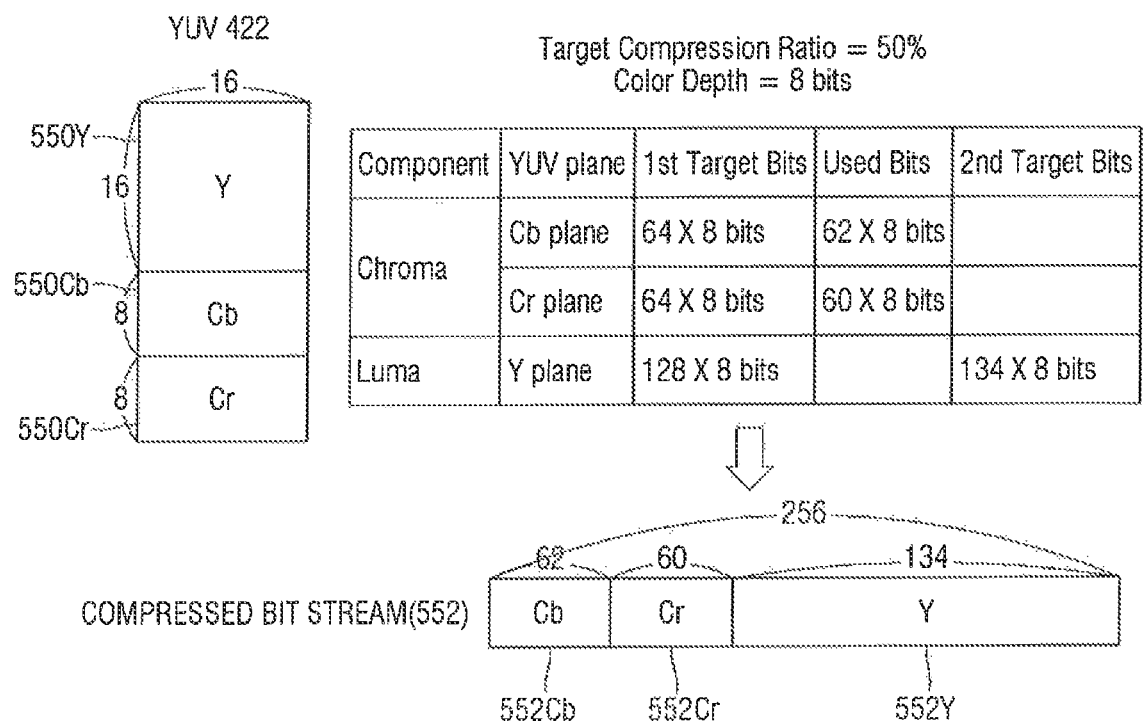
Figure 14:
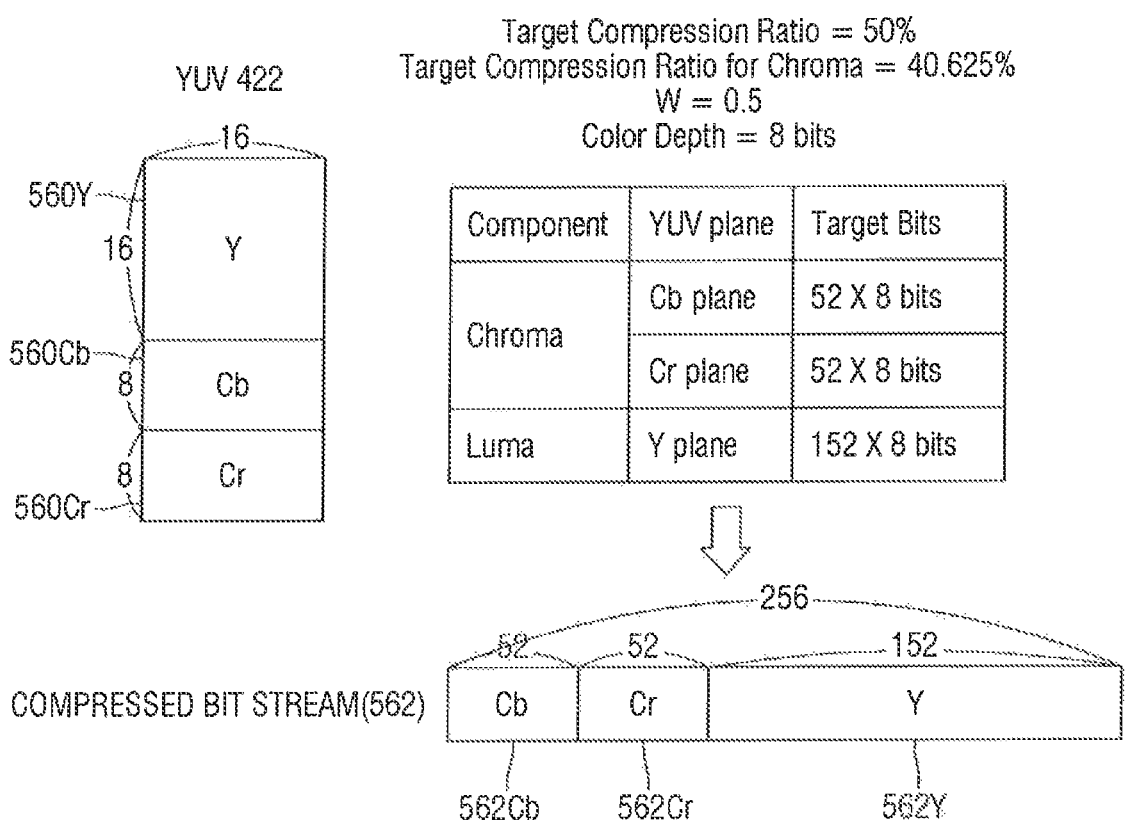

FIGS. 12 to 14 are schematic views for explaining the operation of the image processing device for the YUV 422 format data according to an exemplary embodiment of the present inventive concept.

FIGS. 12 and 13 illustrate a case where the target compression ratio of the image data 10 is 50% and the color depth is 8 bits when the image data 10 conforms to the YUV 420 format.

Referring to FIG. 12, the first component of the image data 10, that is, the luma component corresponds to the Y plane 540Y of the image data 10, and the second component of the image data 10, that is, the chroma component corresponds to the Cb plane 540Cb and the Cr plane 540 Cr of the image data 10.

In the case of the Y plane 540Y, since the target compression ratio is 50% and the color depth is 8 bits, the luma component target bit may be calculated as follows.

Luma component target bit=16×16×8×0.5 bit=128×8 bits

In the case of the Cb plane 540Cb and the Cr plane 540Cr, the Cb plane component target bit and the Cr plane component target bit may be calculated as follows.

Cb plane component target bit=16×8×8×0.5 bit=64×8 bits

Cr plane component target bit=16×8×8×0.5 bit=64×8 bits

As a result, the chroma component target bit obtained by adding the Cb plane component target bit and the Cr plane component target bit is 128×8 bits.

When the luma component and the chroma component are compressed on the basis of the target bit calculated in this manner, both the luma component and the chroma component are compressed at the same compression ratio of 50%.

The compressed bit stream 542 corresponding to the compression result may be formed as a single bit stream having a sequence of, for example, a Y component bit stream 542Y, a Cb component bit stream 542Cb, and a Cr component bit stream 542Cr. However, the scope of the present inventive concept is not limited thereto. For example, the frame buffer compressor 200 may generate the compressed bit stream 542, by merging the compressed data of the first component and the compressed data of the second component in an arbitrary sequence different from the compression sequence of the first component (e.g., luma component) and the second component (e.g., chroma component). That is, the sequence of the Y component bit stream 542Y, the Cb component bit stream 542Cb and the Cr component bit stream 542Cr in the compressed bit stream 542 may be different from that illustrated in FIG. 12.

In an exemplary embodiment of the present inventive concept, the frame buffer compressor 200 generates the compressed bit stream 542, by interleaving and merging the compressed data of the first component and the compressed data of the second component. That is, the Y component bit stream 542Y, the Cb component bit stream 542Cb, and the Cr component bit stream 542Cr may be generated in the compressed bit stream 542, for example, in the form in which the bit streams of the Y, Cb, and Cr components repeated in units of pixels of the image data 10 are mixed in an arbitrary sequence.

For example, the compressed bit stream 542 may be interleaved and merged in the sequence in which a Y component bit stream of the first pixel of the image data 10, a Cb component bit stream of the first pixel, a Cr component bit stream of the first pixel, the Y component bit stream of the second pixel of the image data 10, the Cb component bit stream of the second pixel, and the Cr component bit stream of the second pixel are connected, and the interleaving sequence of Y, Cb, and Cr components may also be determined in an arbitrary sequence.

Referring to FIG. 13, the first component of the image data 10, that is, the luma component corresponds to the Y plane 550Y of the image data 10, and the second component of the image data 10, that is, the chroma component corresponds to the Cb plane 550Cb and the Cr plane 550Cr of the image data 10.

In this embodiment, the compression management module 218 controls the compression sequence so that the frame buffer compressor 200 compresses the chroma component first and then compresses the luma component. To this end, the compression management module 218 first calculates the chroma component target bit, before calculating the luma component target bit.

In the case of the Cb plane 520Cb and the Cr plane 520Cr, the Cb plane component target bit and the Cr plane component target bit may be calculated as follows.

Cb plane component target bit=16×8×8×0.5 bit=64×8 bits
Cr plane component target bit=16×8×8×0.5 bit=64×8 bits The compression management module 218 allocates the chroma component target bit to first perform the compression on the chroma component, before calculating the luma component target bit. Specifically, the compression management module 218 determines the QP value and the entropy k so that the chroma component used bit becomes a value smaller than and closest to the chroma target bit, and performs the compression on the chroma component.

As a result, let us assume that 62×8 bits are used for compression of the Cb plane component and 60×8 bits are used for compression of the Cb plane component. That is, in the present embodiment, the chroma component used bit ((62+60)×8 bits) is smaller than the chroma component target bit ((64+64)×8 bits).

The compression management module 218 calculates the luma component target bit of the luma component, using the chrominance component used bit of the compressed data on the chroma component.

Now, the compression management module 218 may calculate the luma component target bit as follows.

Luma component target bit=total target bit−chroma component used bit=256×8 bits−(62+60)×8 bits=134×8 bits.

Here, the total target bit is a value obtained by multiplying the total sizes (16+8+8)×16×0.5=256 by the color depth value 8, in the case of the Y plane 550Y of 16×16 size, the Cb plane 550Cb of 8×8 size and the Cr plane 550Cr of 8×8 size. Further, 0.5 means the target compression ratio.

The compression management module 218 allocates the luma component target bit thus calculated to compress the luma component.

According to the present embodiment, unlike the compressed bit stream 542 including the Y component bit stream 542Y of 128 bits, the Cb component bit stream 542Cb of 64 bits and the Cr component bit stream 542Cr of 64 bits of FIG. 12, the compressed bit stream 552 including the Cb component bit stream 552Cb of 62 bits, the Cr component bit stream 552Cr of 60 bits and the Y component bit stream 552Y of 134 bits becomes the compression result.

As described above, the frame buffer compressor 200 may generate the compressed bit stream 552, by merging the compressed data of the first component and the compressed data of the second component, in an arbitrary sequence different from the compression sequence of the first component (e.g., luma component) and the second component (i.e., chroma component). That is, the sequence of the Y component bit stream 552Y, the Cb component bit stream 552Cb and the Cr component bit stream 552Cr in the compressed bit stream 552 may be different from that illustrated in FIG. 13.

In an exemplary embodiment of the present inventive concept, the frame buffer compressor 200 generates a compressed bit stream 552, by interleaving and merging the compressed data of the first component and the compressed data of the second component. That is, the Y component bit stream 552Y, the Cb component bit stream 552Cb, and the Cr component bit stream 552Cr in the compressed bit stream 552 may be generated, for example, in the form in which the bit streams of Y, Cb, and Cr components repeated in units of pixels of the image data 10 are mixed in an arbitrary sequence.

In this way, within the same total target bit, by assigning more bits to luma components with higher importance and relatively lower compression efficiency, and by assigning fewer bits to the relatively different chroma components, the compression quality of the compressed data 20 obtained by compressing the image data 10 may be improved.

Next, referring to FIG. 14, the first component of the image data 10, that is, the luma component corresponds to the Y plane 560Y of the image data 10, and the second component of the image data 10, that is, the chroma component corresponds to the Cb plane 560Cb and the Cr plane 560Cr of the image data 10.

In the present embodiment, the compression management module 218 controls the compression sequence so that the frame buffer compressor 200 first compresses the chroma component and then compresses the luma component. To this end, the compression management module 218 first calculates the chroma component target bit, before calculating the luma component target bit. However, the difference from the embodiment of FIG. 13 is that the compression management module 218 previously set the compression ratio for the chroma component to, for example, 40.625% smaller than 50%.

Accordingly, in the case of the Cb plane 560Cb and the Cr plane 560Cr, the Cb plane component target bit and the Cr plane component target bit may be calculated as follows.

Cb plane component target bit=16×8×8×0.40625 bit=52×8 bits

Cr plane component target bit=16×8×8×0.40625 bit=52×8 bits

The compression management module 218 first performs compression on the chroma component first, in accordance with the compression ratio previously set to, for example 40.625%. Specifically, the compression management module 218 determines the QP value and the entropy k value to conform to the preset compression rate, and performs compression on the chroma component. As a result, 52×8 bits were used for compression of the Cb plane component, and 52×8 bits were used for compression of the Cb plane component.

Now, the compression management module 218 may calculate the luma component target bit as follows.

Luma component target bit=total target bit−chroma component target bit according to preset compression ratio=256×8 bits−(52+52)×8 bits=152×8 bits Here, the total target bits is a value obtained by multiplying the total size (16+8+8)×8=256 by the color depth value 8, in the case of the Y plane 560Y of 16×16 size, the Cb plane 560Cb of 8×8 size and the Cr plane 560Cr of 8×8 size. Further, 0.5 means the target compression ratio.

The compression management module 218 allocates the luma component target bit thus calculated and compresses the luma component.

Thus, in at least one embodiment of the present inventive concept, when the image data 10 conforms to the YUV 422 format, the chroma component target bit may be calculated to the total target bit/2 XW by the compression management module 218 (here, W is a positive real number equal to or less than 1). For example, the embodiment of FIG. 14 illustrates a case where the value of W is 0.5.

According to the present embodiment, unlike the compressed bit stream 542 including the Y component bit stream 542Y of 128 bits, the Cb component bit stream 542Cb of 64 bits, and the Cr component bit stream 562 of 64 bits of FIG. 12, the compressed bit stream 562 including the Cb component bit stream 542Cb of 52 bits, the Cr component bit stream 562Cr of 52 bits, and the Y component bit stream 562Y of 152 bits becomes the compression result.

As described above, the frame buffer compressor 200 may generate the compressed bit stream 562, by merging the compressed data of the first component and the compressed data of the second component in an arbitrary sequence different from the compression sequence of the first component (e.g., luma component) and the second component (i.e., chroma component). That is, the sequence of the Y component bit stream 562Y, the Cb component bit stream 562Cb and the Cr component bit stream 562Cr in the compressed bit stream 532 may be different from that illustrated in FIG. 14.

In an exemplary embodiment of the present inventive concept, the frame buffer compressor 200 generates the compressed bit stream 562, by interleaving and merging the compressed data of the first component and the compressed data of the second component. That is, in the compressed bit stream 532, the Y component bit stream 562Y, the Cb component bit stream 562Cb, and the Cr component bit stream 562Cr may be generated in the form in which the bit streams of Y, Cb, and Cr components repeated in units of pixels of the image data 10 are mixed in an arbitrary sequence.

In this way, within the same total target bit, by assigning more bits to luma components with higher importance and relatively lower compression efficiency, and by assigning fewer bits to the relatively different chroma components, the compression quality of the compressed data 20 obtained by compressing the image data 10 can be improved.

Figure 15:
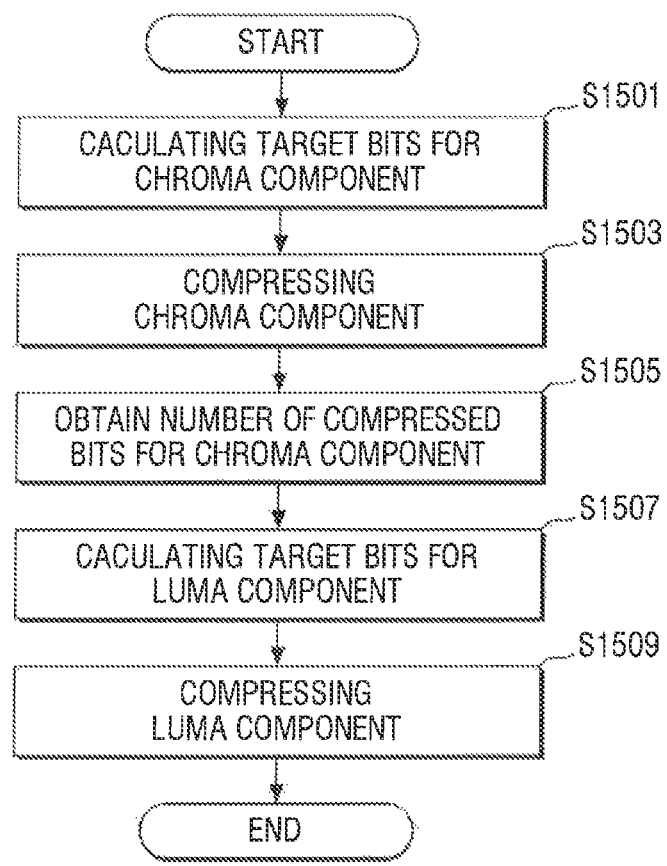
FIG. 15 is a flowchart illustrating a method for operating the image processing device according to an exemplary embodiment of the present inventive concept.

FIG. 15 is a flowchart illustrating a method for operating the image processing device according to an exemplary embodiment of the present inventive concept.

Referring to FIG. 15, the method for operating an image processing device according to an exemplary embodiment of the present inventive concept includes calculating a target bit for the chroma component (S1501).

Specifically, before calculating the target bit for the chroma component, the image processing device calculates the total target bit on the basis of the target compression ratio of the image data 10 conforming to the YUV format, and then calculates the chroma component target bit for compressing the chroma component including the Cb and Cr components in the YUV format.

Further, the method includes assigning the chroma component target bit to compress the chroma component (S1503).

In addition, the method includes obtaining a number of compressed bits for the chroma component (S1505). The number of compressed bits for the chroma component may be referred to as chroma component used bit of the compressed data for the chroma component.

The method further includes calculating target bits for the luma component (e.g., the target bit of the luma component) (S1507). The luma component is the Y component in the YUV format.

Further, the method includes assigning the luma component target bit to compress the luma component (S1509).

Further, the method may further include adding a dummy bit after the compressed data of the luma component, when the sum of the luma component used bit of the compressed data of the luma component and the chroma component used bit is less than the total target bit.

Those skilled in the art will appreciate that many variations and modifications can be made to the exemplary embodiments without substantially departing from the principles of the present inventive concept.

What is claimed is:

1. An image processing device comprising:
   a multimedia intellectual property (IP) block configured to process image data including a first component comprising a luma component and a second component comprising a chroma component;
   a memory; and
   a frame buffer compressor (FBC) configured to compress the image data to generate compressed data and store the compressed data in the memory, wherein the frame buffer compressor includes an encoder and a decoder,
   wherein the encoder includes a first mode selector configured to determine whether to perform a first mode or a second mode,
   wherein the encoder includes a compress manager configured to control a compression sequence of the first component and the second component of the image data,
   wherein the compression sequence includes performing an entropy encoding, and the compress manager determines at least one parameter of the entropy encoding so that the chroma component is compressed to a number of bits smaller than a chroma target bit count determined from a target compression ratio and the chroma component.

2. The image processing device of claim 1, wherein the encoder further includes a plurality of compress modules configured to compress the image data to generate the compressed data, wherein a number of compress modules used for generating the compressed data in the first mode is different from a number of compress modules used for generating the compressed data in the second mode.

3. The image processing device of claim 2, wherein the plurality of compress modules include:
a first compress module configured to compress the image data to generate a first compressed data;
a second compress module configured to compress the first compressed data to generate a second compressed data; and
a third compress module configured to compress the second compressed data to generate a third compressed data, wherein the second compress module is used for generating the compressed data in the first mode, and the second compress modules is not used for generating the compressed data in the second mode.

4. The image processing device of claim 3, wherein the first compress module includes a prediction module configured to perform prediction for the image data, the second compress module includes a quantization module configured to remove lower bits of the first compressed data through a quantization coefficient, the third compress module includes an entropy encoding module configured to perform entropy encoding on the second compressed data in the first mode and on the first compressed data in the second mode.

5. The image processing device of claim 1, wherein the encoder further includes a quantization module configured to remove lower bits of the image data through a quantization coefficient.

6. The image processing device of claim 5, wherein the quantization module is utilized in the first mode and is not utilized in the second mode.

7. The image processing device of claim 1, wherein the compress manager controls the compression sequence of the first component and the second component of the image data in response to the determination of the first mode selector to perform the first mode.

8. The image processing device of claim 1, wherein the compress manager sets a target bit of the second component to a total target bit/3×W, where W is a positive real number <=1 and the total target bit is determined from the image data and the target compression ratio.

9. The image processing device of claim 1, wherein the compress manager sets a target bit of the second component to a total target bit/2×W, where W is a positive real number <=1 and the total target bit is determined from the image data and the target compression ratio.

10. The image processing device of claim 1, wherein the frame buffer compressor interleaves and merges the compressed data of the first component and the compressed data of the second component to generate a single bit stream.

11. An image processing device comprising:
a multimedia intellectual property (IP) block configured to process image data including a first component comprising a luma component and a second component comprising a chroma component;
a memory storing compressed data of the image data; and
a frame buffer compressor (FBC) configured to decompress the compressed data to generate the image data, wherein the frame buffer compressor includes a decoder,
wherein the decoder includes a first mode selector configured to determine whether to perform a first mode or a second mode,
wherein the decoder includes a decompress manager configured to control a decompression sequence of the first component and the second component of the image data,
wherein the image data was compressed to generate the compressed data by performing an entropy encoding according to at least one parameter determined so that the chroma component is compressed to a number of bits smaller than a chroma target bit count determined from a target compression ratio and the chroma component.

12. The image processing device of claim 11, wherein the decompress manager controls the decompression sequence of the first component and the second component of the compressed data in response to the determination of the first mode selector to perform the first mode.

13. The image processing device of claim 11, wherein the decoder includes:
a first decompress module configured to decompress the compressed data to generate a first decompressed data;
a second decompress module configured to decompress the first decompressed data to generate a second decompressed data; and
a third decompress module configured to decompress the second decompressed data to generate the image data, wherein the second decompress module is used for generating the image data in the first mode, and the second decompress modules is not used for generating the image data in the second mode.

14. The image processing device of claim 13, wherein the frame buffer compressor further includes an encoder, wherein the encoder is configured to compress the image data to generate the compressed data, wherein the encoder includes a second mode selector different from the first mode selector and configured to determine whether to perform the first mode or the second mode.

15. The image processing device of claim 14, wherein the encoder includes:
a first compress module configured to compress the image data to generate a first compressed data;
a second compress module configured to compress the first compressed data to generate a second compressed data; and a third compress module configured to compress the second compressed data to generate a third compressed data,
wherein the second compress module is used for generating the compressed data in the first mode, and the second compress modules is not used for generating the compressed data in the second mode.

16. An image processing device comprising:
a multimedia intellectual property (IP) block configured to process image data including a first component comprising a luma component and a second component comprising a chroma component;
a memory; and
a frame buffer compressor (FBC) including an encoder configured to compress the image data to generate compressed data and store the compressed data in the memory and a decoder configured to decompress the compressed data in the memory to generate the image data,
wherein the encoder includes a first mode selector configured to determine whether to perform a first mode or a second mode and a compress manager configured to control a compression sequence of the first component and the second component of the image data in response to the determination of the first mode selector to perform the first mode, wherein the decoder includes a second mode selector configured to determine whether to perform the first mode or the second mode and a decompress manager configured to control a decompression sequence of the first component and the second component of the compressed data in response to the determination of the second mode selector to perform the first mode;

wherein the compress manager sets a compress target bit of the chroma component to a total compress target bit divided by a value associated with a format of the luma component and the total compress target bit is determined from the image data and a target compression ratio.

17. The image processing device of claim 16, wherein the encoder further includes a plurality of compress modules configured to compress the image data to generate the compressed data, wherein the decoder further includes a plurality of decompress modules configured to decompress the compressed data to generate the image data, wherein a number of compress modules used for generating the compressed data in the first mode is different from a number of compress modules used for generating the compressed data in the second mode, wherein a number of decompress modules used for generating the image data in the first mode is different from a number of decompress modules used for generating the image data in the second mode.

18. The image processing device of claim 16, wherein the value is 3 times W and W is a positive real number <=1.

19. The image processing device of claim 16, wherein where the value is 2times W and W is a positive real number <=1.

20. The image processing device of claim 16, wherein the frame buffer compressor interleaves and merges the compressed data of the first component and the compressed data of the second component to generate a single bit stream.

* * * * *